(12) United States Patent
Lee

(10) Patent No.: US 7,086,665 B2
(45) Date of Patent: Aug. 8, 2006

(54) STEERING COLUMN SUPPORT MOUNTING BRACKET FOR AUTOMOBILE

(75) Inventor: Jong-won Lee, Seoul (KR)

(73) Assignee: Hyundai Mobis, Seoul (KR)

( * ) Notice: Subject to any disclaimer, the term of this patent is extended or adjusted under 35 U.S.C. 154(b) by 155 days.

(21) Appl. No.: 10/682,971

(22) Filed: Oct. 14, 2003

(65) Prior Publication Data

US 2005/0035585 A1    Feb. 17, 2005

(30) Foreign Application Priority Data

Aug. 11, 2003  (KR) .................... 10-2003-0055385

(51) Int. Cl.
*B62D 1/16* (2006.01)

(52) U.S. Cl. .................................... 280/779

(58) Field of Classification Search ............... 280/779, 280/752; 180/90; 296/203.02
See application file for complete search history.

(56) References Cited

U.S. PATENT DOCUMENTS

| 5,181,435 | A | * | 1/1993 | Khalifa et al. ............. 74/492 |
| 5,259,646 | A | | 11/1993 | Snyder |
| 6,027,088 | A | | 2/2000 | Stedman et al. |
| 6,415,680 | B1 | | 7/2002 | Jurik et al. |
| 6,481,786 | B1 | * | 11/2002 | Kim ..................... 296/203.02 |
| 6,827,393 | B1 | * | 12/2004 | Tilsner et al. .......... 296/193.02 |
| 2005/0093285 | A1 | * | 5/2005 | Lee et al. ................... 280/779 |

* cited by examiner

*Primary Examiner*—Faye M. Fleming
(74) *Attorney, Agent, or Firm*—Greenblum & Bernstein, P.L.C.

(57) ABSTRACT

A steering column support mounting bracket for an automobile which can increase the strength by reducing the weight of the steering column support mounting bracket and decreases the number of parts by pivotally coupling a brake pedal unit to a lower portion thereof. The steering column support mounting bracket includes a supporting plate which is coupled to a predetermined position of a cowl cross bar and is made of a plastic material and a reinforcing plate which is coupled to one side of the supporting plate and is made of a steel material so as to increase the strength of the supporting plate. A brake pedal unit is pivotally connected to a lower portion of the mounting bracket.

2 Claims, 4 Drawing Sheets

STEERING COLUMN SUPPORT MOUNTING BRACKET FOR AUTOMOBILE

RELATED APPLICATION

The present disclosure relates to subject matter contained in Korean application No. 2003-55385, filed on Aug. 11, 2003, which is herein expressly incorporated by reference its entirety.

BACKGROUND OF THE INVENTION

1. Field of the Invention

The present invention relates to a steering column support mounting bracket for an automobile, and more particularly, to a steering column support mounting bracket for an automobile which can increase the strength by reducing the weight of the steering column support mounting bracket and that can decrease the number of parts by pivotally coupling a brake pedal unit to the lower portion thereof, thereby reducing costs.

2. Description of the Related Art

At a lower portion of an instrument panel of an automobile installed is a cowl cross bar for restraining the engine and the side frames of the vehicle body from protruding into the interior upon collision of the front and sides of the vehicle.

As shown in FIG. 1, the cowl cross bar 20 is arranged in an perpendicular direction at the lower end to the instrument panel 11 (FIG. 2), both opposite ends coupled to the vehicle body by a fastening bracket 30.

Also, the central portion of the cowl cross bar 20 is also supported by a mounting bracket 40 that is to be attached to the lower end of the instrument panel 11 and by a frame 50 for mounting an audio system or the like of the vehicle.

In addition, the cowl cross bar 20 is welded to the fastening bracket 30 and the mounting bracket 40.

Especially, the mounting bracket 40 is coupled in such a manner that parts of the upper portion are cut away and the cowl cross bar 20 is inserted, and then welding is carried out to the point where these two members meet.

Typically, the cowl cross bar 20 and the mounting bracket 40 are made from a steel material so that they can be properly welded.

If the above-mentioned bracket is made from a steel material which is heavier, so after a period of time, the welding strength of the mounting bracket 40 is lower and the mounting bracket 40 may come detached from the cowl cross bar 20 because of this weight.

Recently, the mounting bracket 40 has been made from a magnesium material which is lighter than steel.

U.S. Pat. No. 6,027,088 discloses a plastic steering column support mounting bracket of the structure as shown in FIG. 2.

As shown in FIG. 2, the mounting bracket 41 is made of a plastic material, preferably nylon reinforced with glass fibers.

The mounting bracket 41 forms a X-shaped frame.

And, the mounting bracket 41 is coupled onto the instrument panel 11.

In addition, a brake bracket 60 is coupled to the lower portion of the mounting bracket 41 by threaded bolts 65.

And, a brake pedal unit 62 is pivotally coupled to the lower portion of the brake bracket 60.

However, since the conventional mounting bracket coupled to the cowl cross bar is made of a magnesium material, it is lighter than the steel material, but costs more.

In addition, the mounting bracket made of a magnesium material is relatively weak compared to steel, so it is easily damaged even by external impact.

Further, in a conventional mounting bracket, the brake bracket and the brake pedal unit are coupled to each other and the mounting bracket is made from a magnesium material of lower strength. Thus, if the brake pedal unit is operated over a long time period, the mounting bracket may become damaged or deformed.

Moreover, since a brake bracket is additionally provided between the mounting bracket and the brake pedal unit, costs are increased.

SUMMARY OF THE INVENTION

The present invention is designed in consideration of the problems of the prior art, and therefore it is an object of the present invention to provide a steering column support mounting bracket which makes the mounting bracket fastening a steering column lightweight and increases its strength, and simplifies the structure by pivotally coupling a brake pedal unit to a lower portion thereof.

To achieve the above object, there is provided a steering column support mounting bracket for an automobile, the mounting bracket comprising: a supporting plate which is coupled to a predetermined position of a cowl cross bar and is made of a plastic material; and a reinforcing plate which is coupled to one side of the supporting plate and is made of a steel material so as to increase the strength of the supporting plate, wherein a brake pedal unit is pivotally connected to a lower portion of the mounting bracket.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
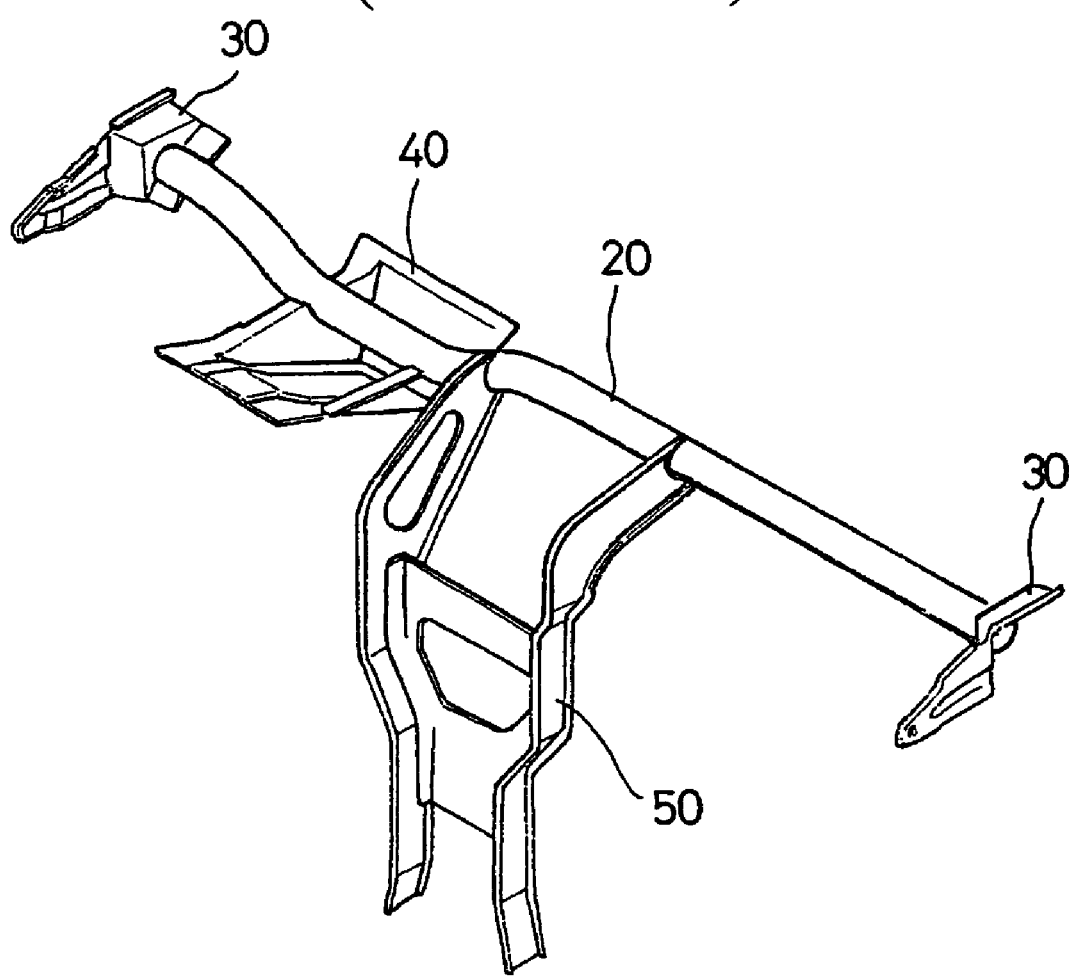
FIG. 1 is a perspective view showing one example of a conventional steering column support mounting bracket mounted on a cowl cross bar.
Figure 2:
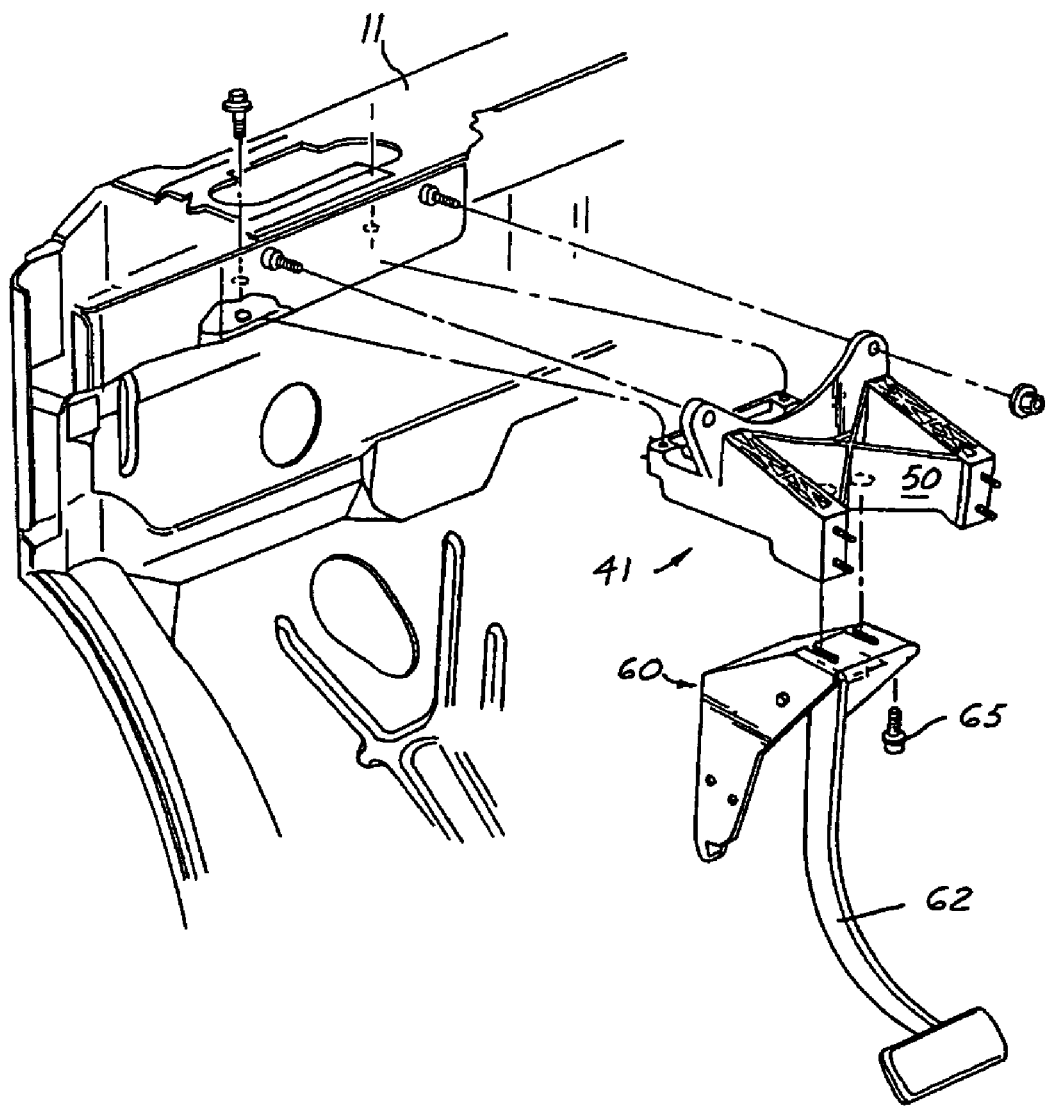
FIG. 2 is a perspective view showing another example of a conventional steering column support mounting bracket mounted on a cowl cross bar.

Hereinafter, a steering column support mounting bracket according to a preferred embodiment of the present invention will be described in more detail referring to the drawings.

Figure 3:
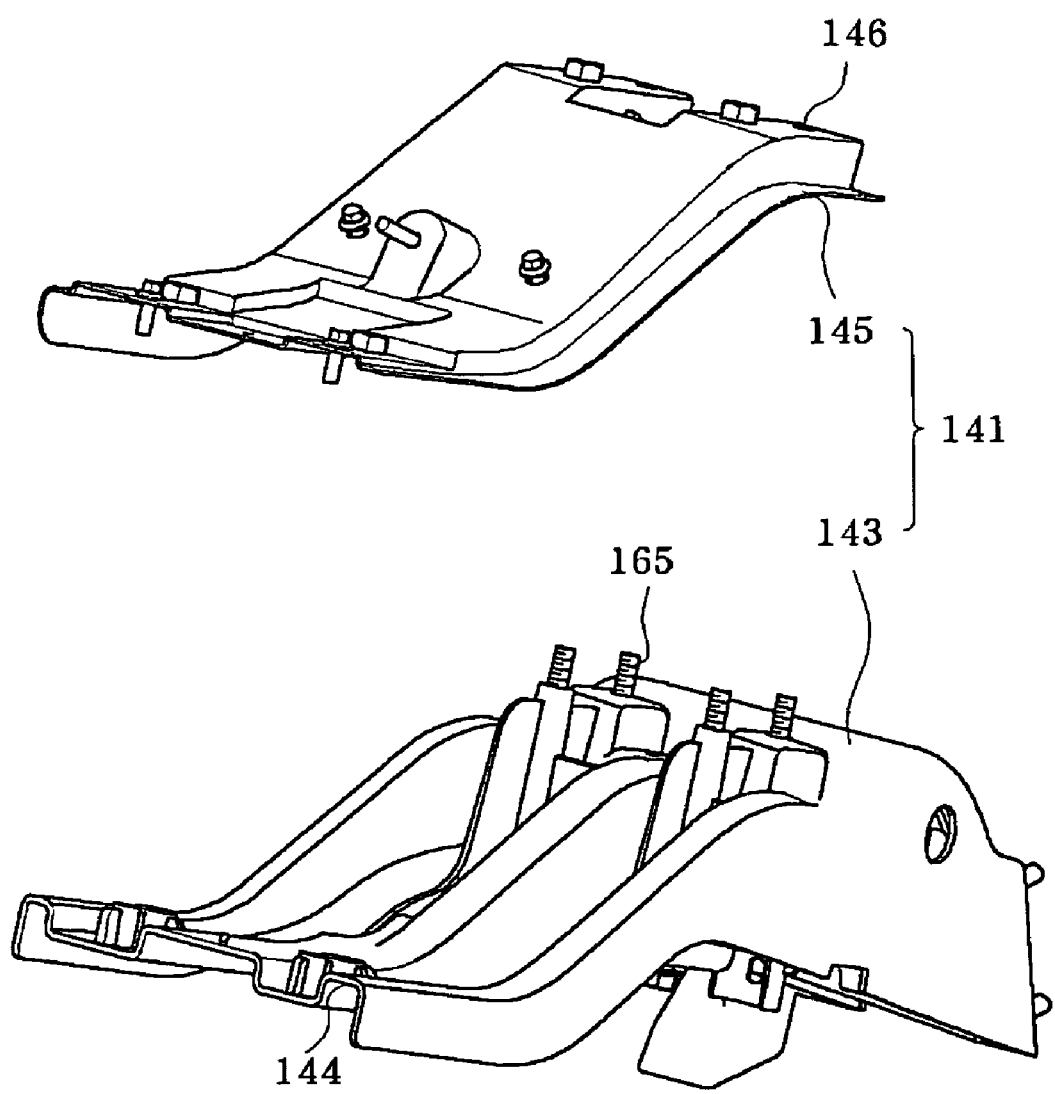
FIG. 3 is an exploded perspective view showing a steering column support mounting bracket according to the present invention.
Figure 4:
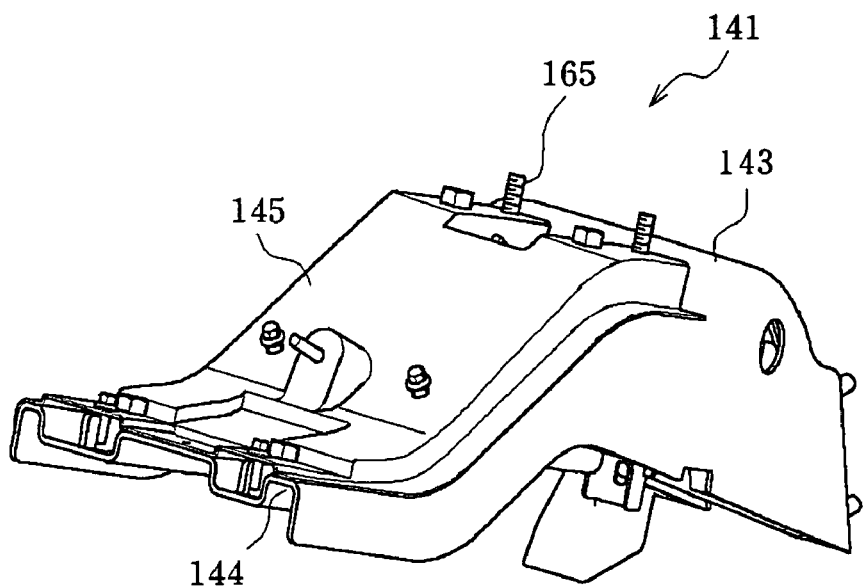
FIG. 4 is a perspective view showing a coupled state of the mounting bracket of FIG. 3.
Figure 5:
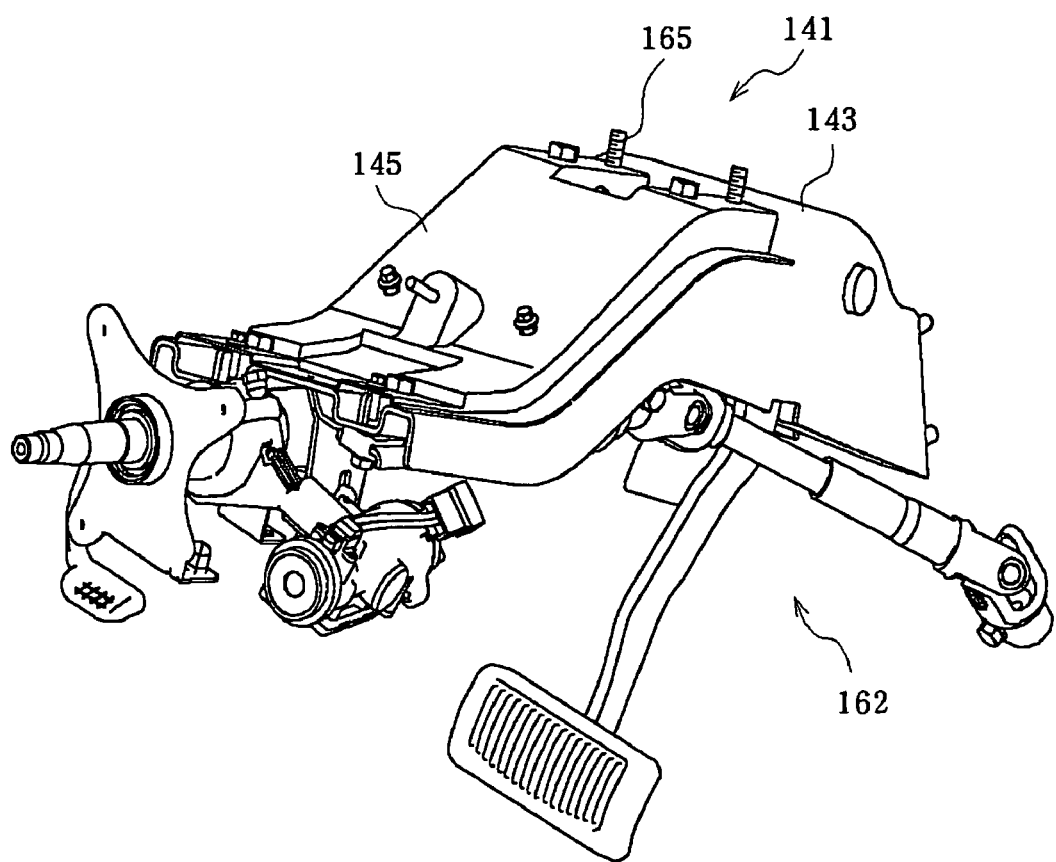
FIG. 5 is a perspective view showing a mounted state of a brake pedal unit to the steering column support mounting bracket according to the present invention.

FIG. 3 is an exploded perspective view showing a steering column support mounting bracket according to the present invention. FIG. 4 is a perspective view showing a coupled state of the mounting bracket of FIG. 3. FIG. 5 is a perspective view showing a mounted state of a brake pedal unit to the steering column support mounting bracket according to the present invention.

As shown therein, the steering column support mounting bracket 141 for an automobile according to the present invention includes a supporting plate 143 which is coupled to a predetermined position of a cowl cross bar (not shown) by threaded bolts 165 and made of a plastic material, and an reinforcing plate 145 which is coupled to one side of the supporting plate 143 and is made of a steel material increasing the strength of the supporting plate 143. At a lower portion of the mounting bracket 141, a brake pedal unit 162 is pivotally connected.

As shown in FIGS. 3 and 4, the mounting bracket 141 for supporting a steering column with a steering wheel (not shown) fastened to the upper end is coupled to the predetermined position of the cowl cross bar (not shown) of the automobile.

The mounting bracket of this invention includes a supporting plate 143 and a reinforcing plate 145.

And, the supporting plate 143 has a predetermined surface area and the upper end portion is coupled to the cowl cross bar.

That is, parts of multiple threaded bolts 165 penetrate the center portion of the supporting plate 143 to be mounted thereto.

And, the supporting plate 143 is relatively low-priced, and made of a plastic material with superior durability.

In case the supporting plate 143 is a flat plate, it may be easily damaged or deformed by an external impact. To prevent this, the supporting plate 143 is formed with a depressed portion 144 extending in a lengthwise direction thereof.

Although the supporting plate 143 can be increased in strength with additional thickness, but is problematic as it becomes heavy. Hence, in order to make the supporting plate 143 lightweight by reducing the weight and increasing the strength, the present invention provides the depressed portion 144 projecting on the opposite side edge portions of the supporting plate 143 at a predetermined height.

In order to increase the strength, preferably, the depressed portion 144 of the supporting plate 143 has a larger thickness than other portions of the supporting plate excluding the depressed portion.

In addition, the preferred embodiment of the present invention exemplifies a structure in which the reinforcing plate 145 is coupled for increasing the strength since the supporting plate 143 is made of a plastic material.

Preferably, the reinforcing plate 145 is made of a steel material in order to increase the strength of the supporting plate 143 made of the plastic material and make the coupling with the steering column easier.

And, since the reinforcing plate 145 is made of steel, it preferably has a small thickness to reduce the overall weight of the mounting bracket 141.

At one end of the reinforcing plate 145, a plurality of holes 146 are perforated.

Upon assembly, the threaded bolts 165 penetrating the supporting plate 143 to be mounted thereto are inserted into the holes 146 of the reinforcing plate 145.

That is, the reinforcing plate 145 is arranged on the top of the supporting plate 143, and the threaded bolts 165 are inserted into the holes 146 of the reinforcing plate 145 and then engaged to the outer periphery of the cowl cross bar.

In this way, the mounting bracket 141 is fastened to the cowl cross bar.

Preferably, at least four threaded bolts 165 are disposed in order to stably fasten the mounting bracket.

As shown in FIG. 5, the brake pedal unit 162 is disposed on a lower portion of the mounting bracket 141.

More specifically, the brake pedal unit 162 is pivotally coupled to the lower portion of the supporting plate 143 of the mounting bracket 141.

In the process of disposing the reinforcing plate 145 on the supporting plate 143, as above mentioned, the holes 146 of the reinforcing plate 145 are fitted and assembled to the threaded bolts 165 of the supporting plate 143.

Upon operating the brake pedal unit 162, in order to prevent the moving of the mounting bracket 141, the mounting bracket 141 is coupled to the cowl cross bar by multiple threaded bolts 165.

As described above, according to the steering column support mounting bracket for automobiles according to the present invention, the supporting plate of the mounting bracket is relatively lightweight and low-priced because it is formed of a plastic material, thereby reducing costs.

Furthermore, in order to reinforce the strength of the plastic supporting plate, the reinforcing plate of a steel material is coupled to the upper portion of the supporting plate, thereby increasing the strength.

Moreover, the brake pedal unit is pivotally mounted directly to the lower portion of the mounting bracket, and thus the number of parts is reduced, thereby reducing costs.

What is claimed is:

1. A steering column support mounting bracket for an automobile, the mounting bracket comprising:

a supporting plate which is coupled to a predetermined position of a cowl cross bar and which is made of a plastic material;

a reinforcing plate which is coupled to an upper side of the supporting plate and which is made of a steel material to increase the strength of the supporting plate; and a plurality of depressed portions provided in the supporting plate, the depressed portions having a greater thickness than other portions of the supporting plate, wherein a brake pedal unit is pivotally connectable to a lower portion of the mounting bracket.

2. The bracket of claim 1, wherein the depressed portions extend along opposite side edge portions of the supporting plate.

* * * * *